United States Patent

Marriere et al.

[11] Patent Number: 6,082,648
[45] Date of Patent: Jul. 4, 2000

[54] ELECTRIC HOUSEHOLD APPLIANCE FOR PROCESSING FOOD COMPRISING A DEVICE FOR STORING COOKING EQUIPMENT

[75] Inventors: Marc Marriere, Ambrieres les Vallees; Bruno Leverrier, Lassay les Chateaux, both of France

[73] Assignee: Moulinex S.A., Paris, France

[21] Appl. No.: 09/254,958

[22] PCT Filed: Sep. 10, 1997

[86] PCT No.: PCT/FR97/01602

§ 371 Date: Apr. 14, 1999

§ 102(e) Date: Apr. 14, 1999

[87] PCT Pub. No.: WO98/11810

PCT Pub. Date: Mar. 26, 1998

[30] Foreign Application Priority Data

Sep. 20, 1996 [FR] France .................................. 96 11520

[51] Int. Cl.$^7$ ............................ B02C 18/12; B02C 18/18
[52] U.S. Cl. .................................. 241/282.1; 241/282.2; 241/285.1; 241/285.2
[58] Field of Search ................................ 241/37.5, 282.1, 241/282.2, 285.1, 285.2, 285.3, 301, 169.1, 101.2

[56] References Cited

U.S. PATENT DOCUMENTS

| | | | |
|---|---|---|---|
| 3,892,365 | 7/1975 | Verdun | 241/92 |
| 4,081,145 | 3/1978 | Moe et al. | 241/93 |
| 4,334,724 | 6/1982 | Rogers, Sr. . | |
| 4,387,860 | 6/1983 | Necas et al. . | |
| 4,700,903 | 10/1987 | Henn | 241/101.2 |
| 4,733,827 | 3/1988 | Williams | 241/101.2 |
| 5,071,077 | 12/1991 | Arroubi et al. | 241/36 |

FOREIGN PATENT DOCUMENTS 0 058 118  8/1982  European Pat. Off. .

*Primary Examiner*—John M. Husar
*Attorney, Agent, or Firm*—Young & Thompson

[57] ABSTRACT

Electric household appliance for processing foodstuffs, comprising a housing (2) enclosing a motor and having a base (4) on which is removably mounted a bowl (6) whose bottom is traversed by a shaft of the motor, various rotatable tools (17,25–27,49–51) mounted alternatively removably in the bowl to be coupled with said shaft, and a device (35) for storage of the tools when none of them is used. According to the invention, the storage device (35) comprises a tool holder piece (37) which is removably mounted in the bowl (6).

9 Claims, 6 Drawing Sheets

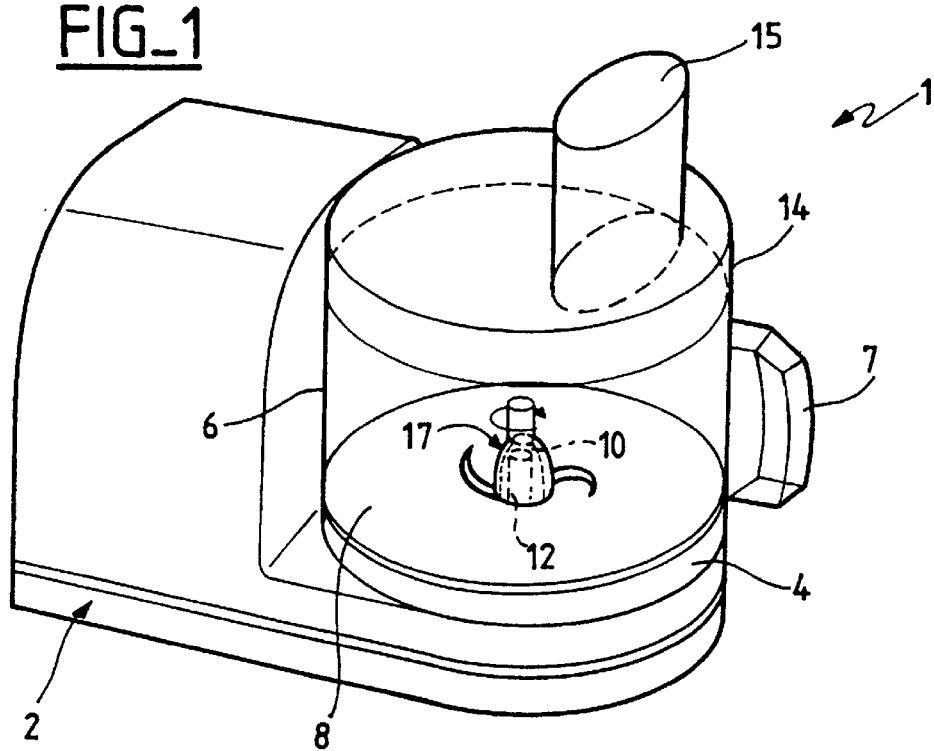
FIG_1
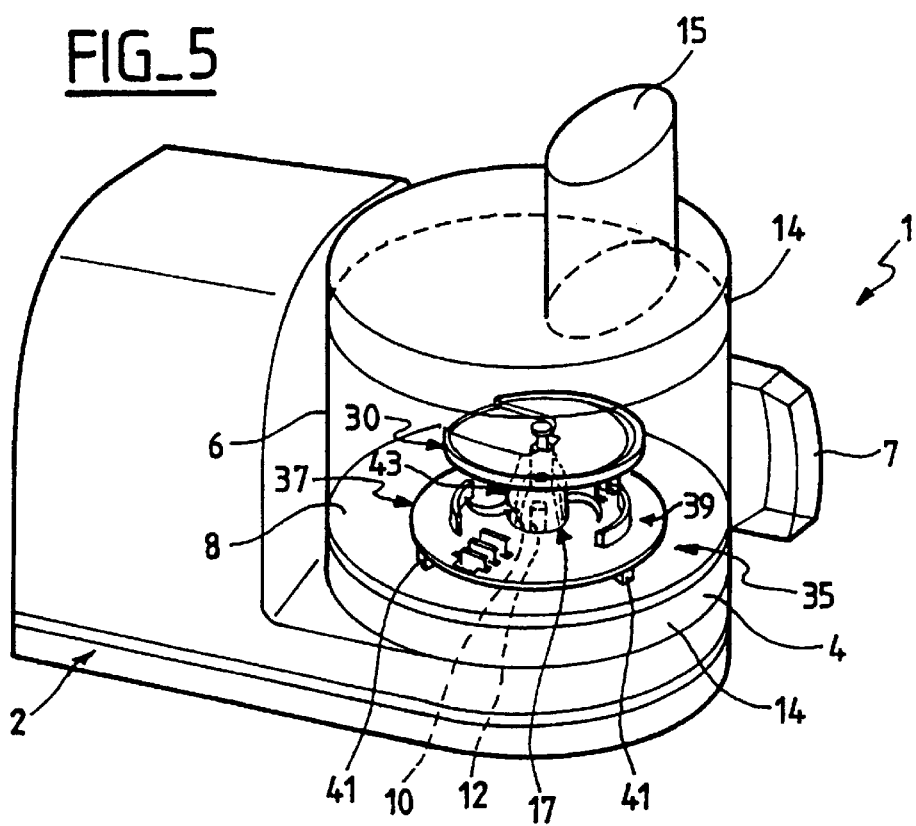
FIG_5

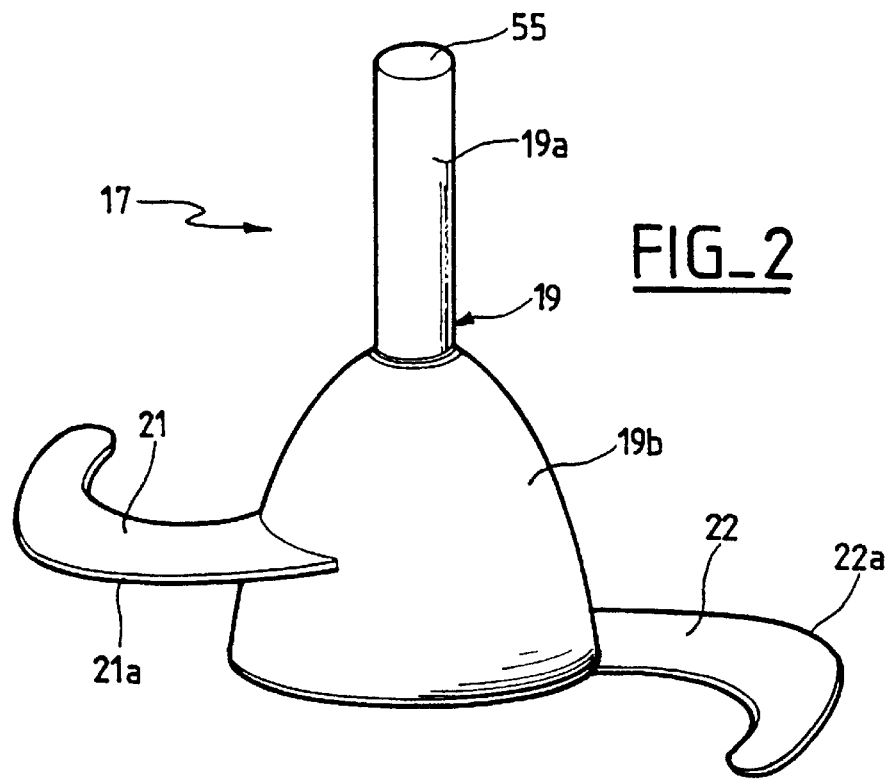
FIG_2
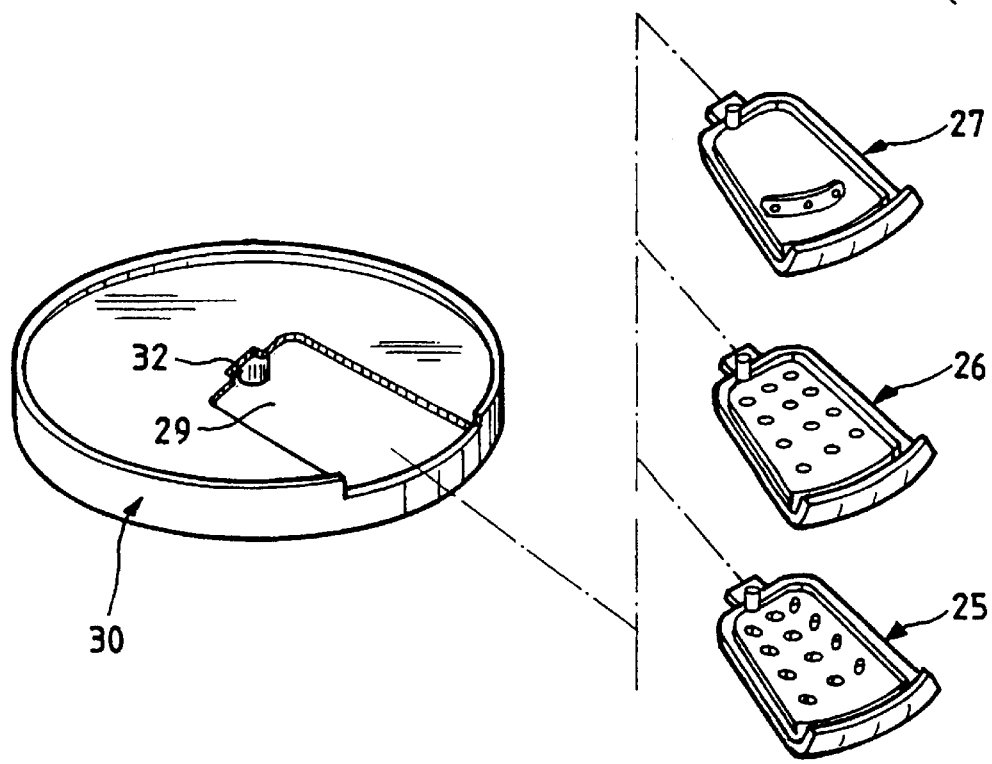
FIG_3

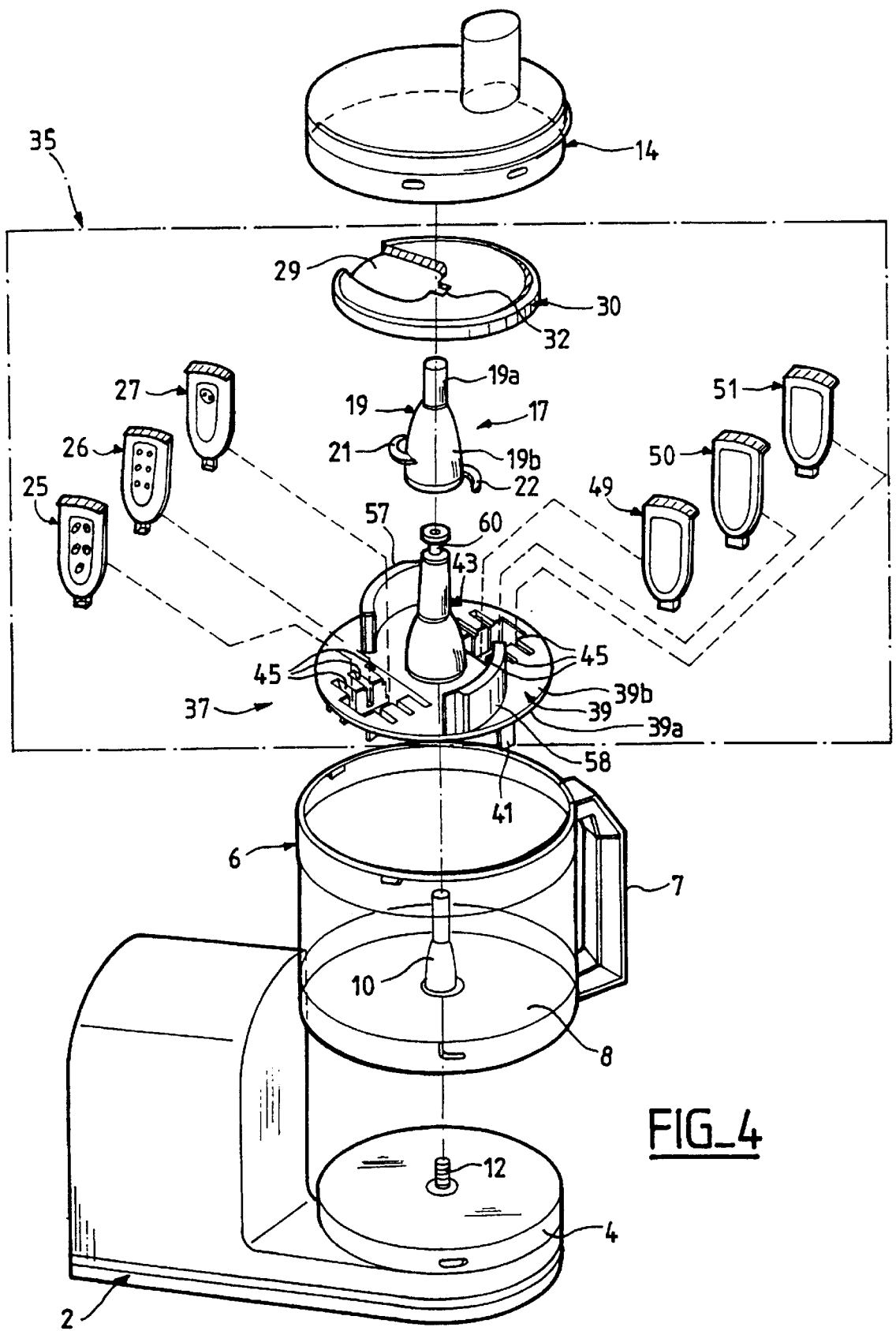
FIG_4

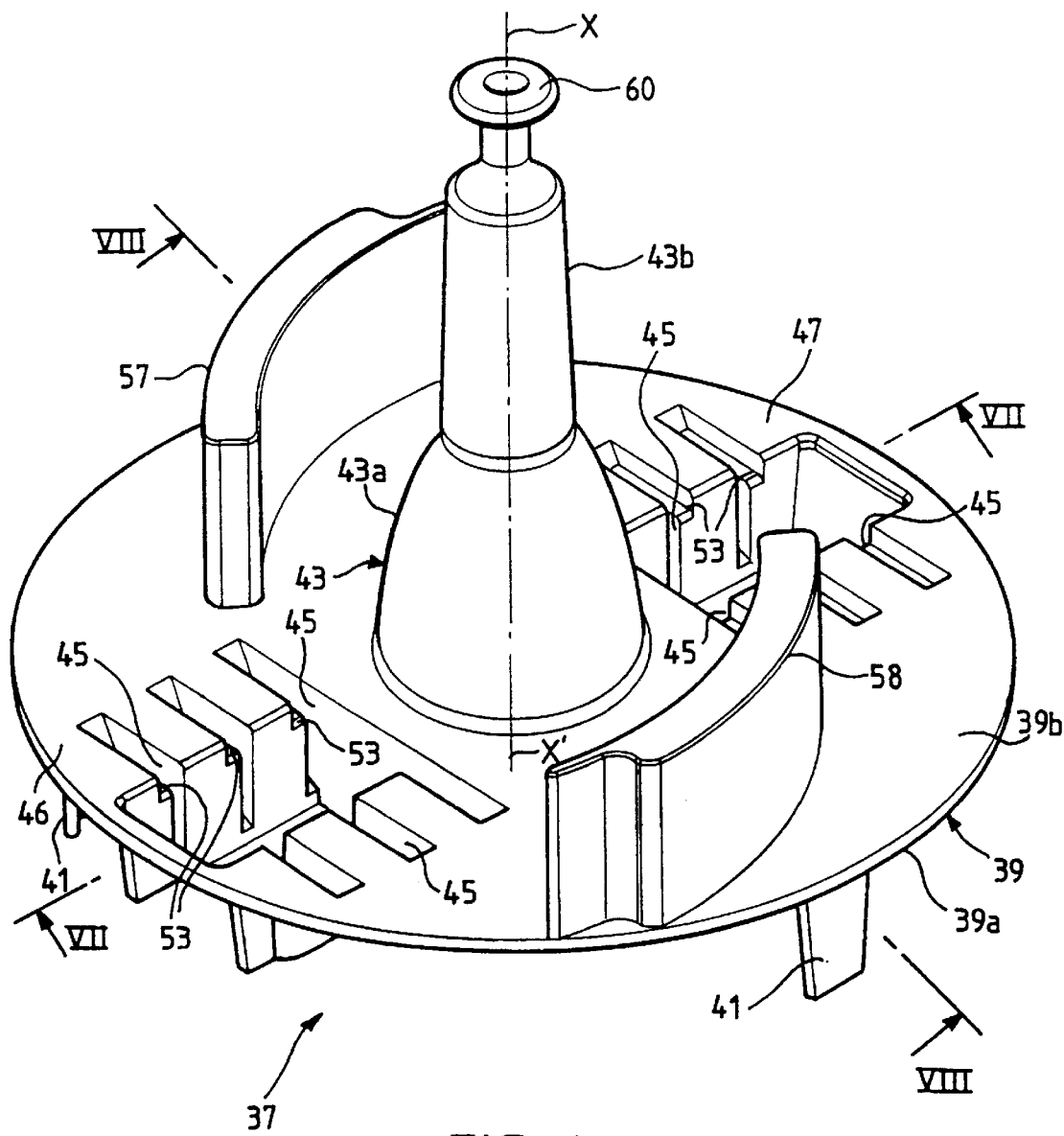
FIG_6

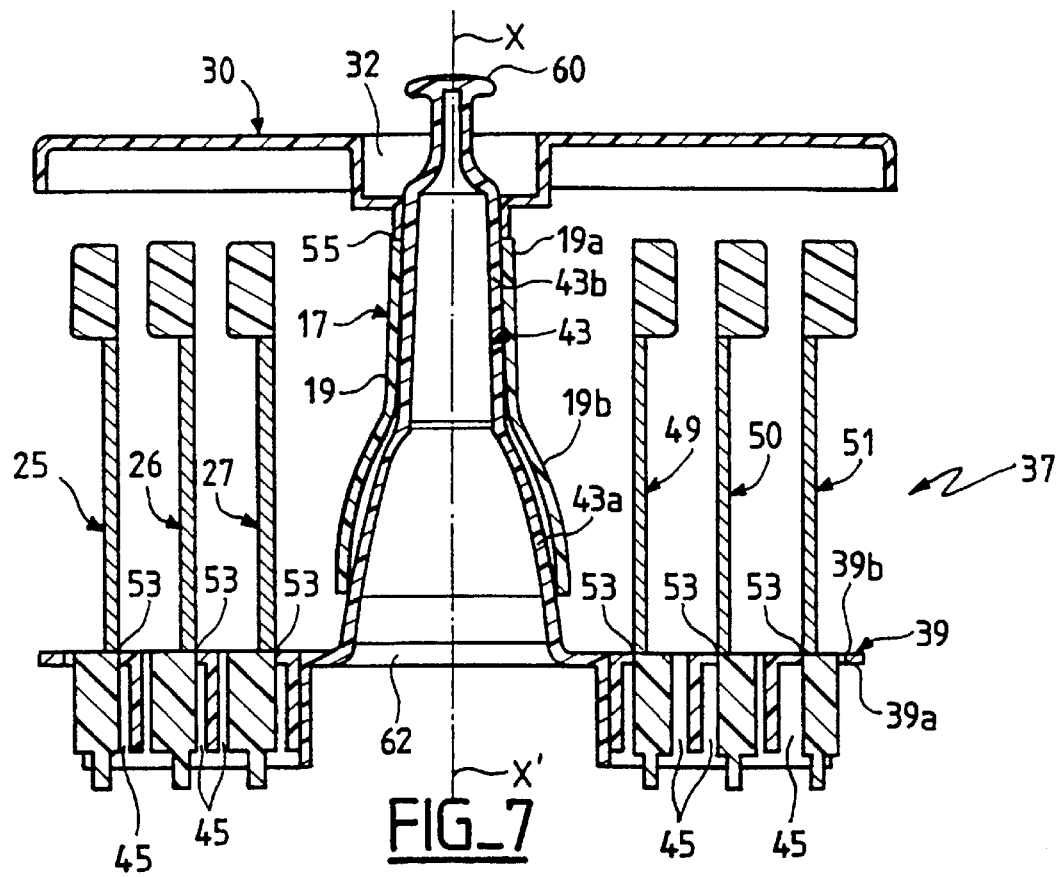
FIG_7
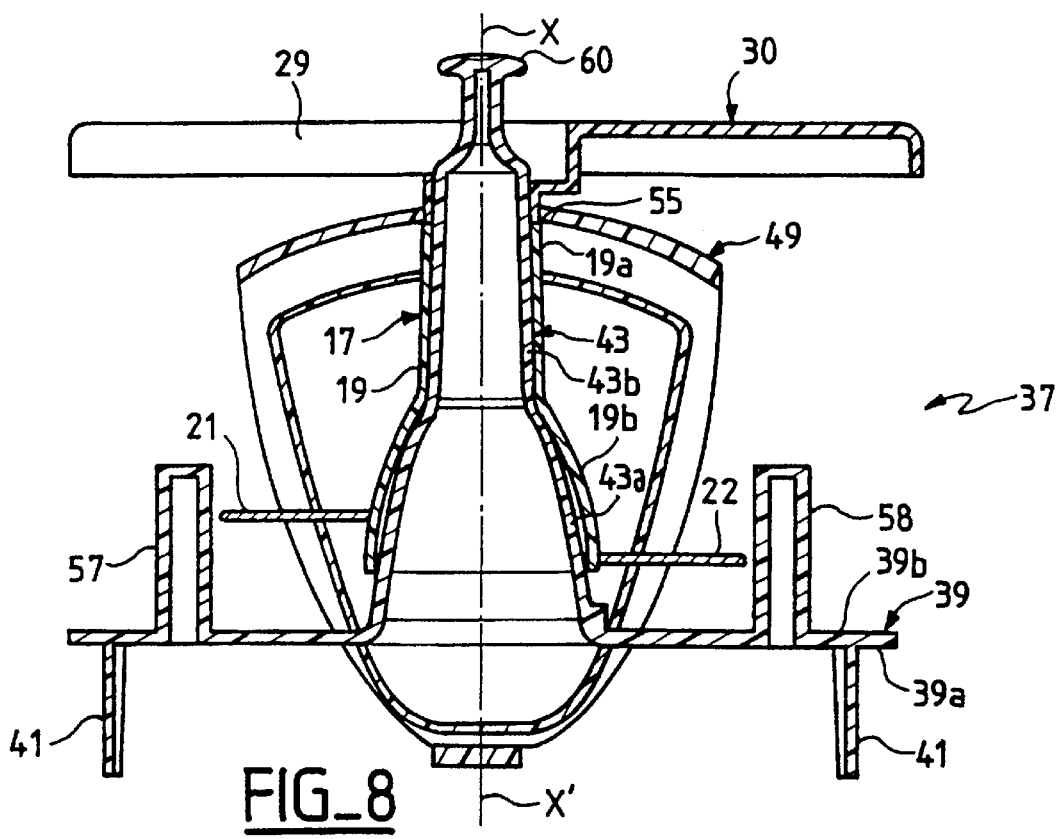
FIG_8

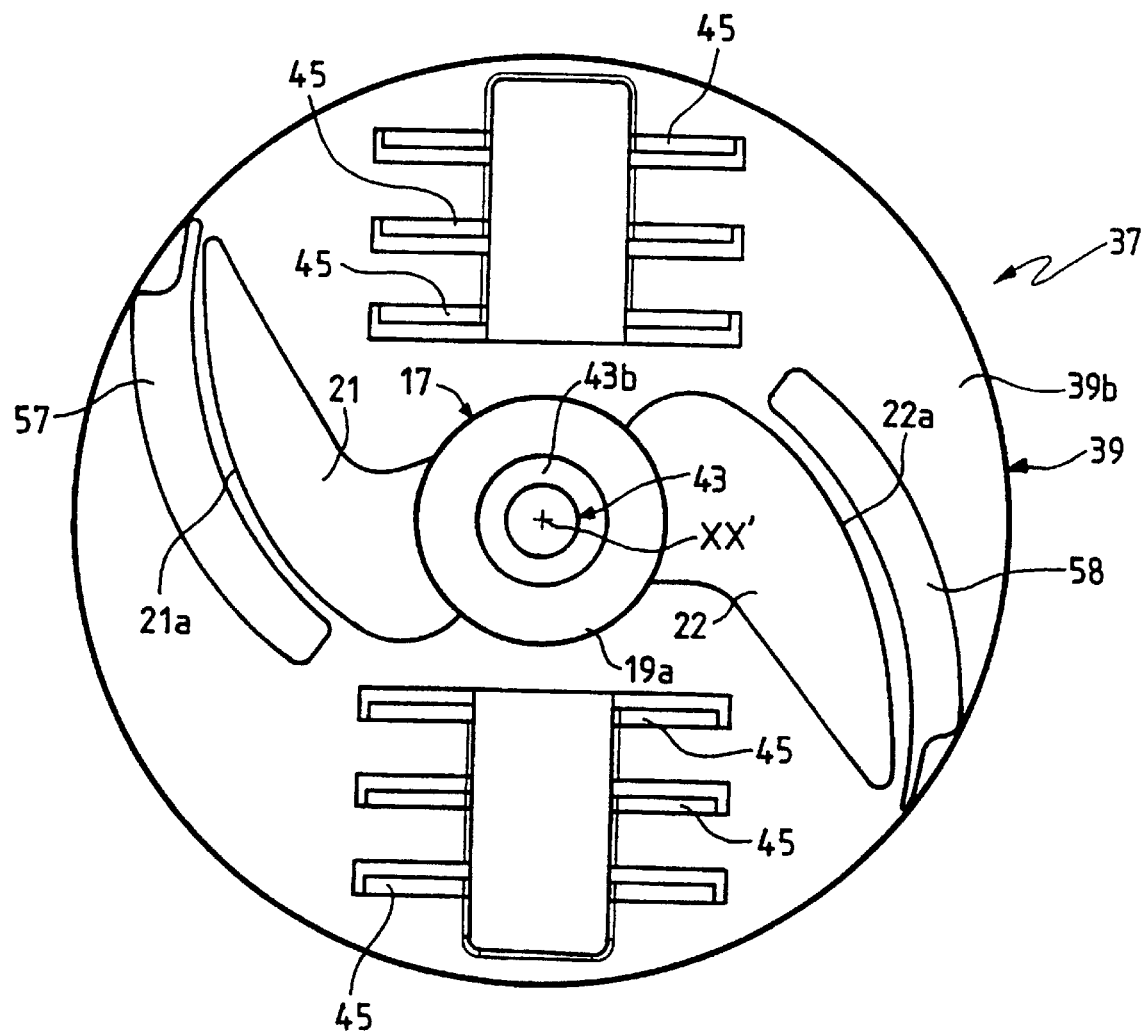
FIG_9

ELECTRIC HOUSEHOLD APPLIANCE FOR PROCESSING FOOD COMPRISING A DEVICE FOR STORING COOKING EQUIPMENT

The present invention relates to an electric household appliance for processing food, of the type known as a kitchen robot, comprising a housing enclosing a motor group and having a region forming a base on which is removably mounted a bowl whose bottom is traversed by a drive shaft of the motor group, various rotatable working tools fulfilling different functions and mounted alternatively removably in the bowl by being coupled with said drive shaft, as well as a device permitting storing the tools when none is used.

In such an electric household appliance, the different specialized functions for food processing, such as chopping, mixing, grating, mincing or cutting fruits or vegetables, are accomplished by various suitable rotatable tools which are driven in rotation in the working bowl by the motor so as to carry out various processing operations selected by the user.

With such an electric household appliance for food processing which uses a multiplicity of tools of which only one is used for each operation, there is therefore the problem of storing the various tools when none of them is used, which is to say when the apparatus is not in service. To solve this problem, it has thus been proposed to design a storage box for the tools which can be entirely independent of the apparatus itself, or else can be laterally connected to the housing of the apparatus. In all these cases, such a box constitutes a supplemental piece which has the drawback of being particularly cumbersome.

The invention accordingly proposes, solving in a simple and effective manner this problem of storing tools when they are not used.

According to the invention, this object is achieved by an electric household appliance for food processing, of the type described above, which is characterized in that the storage device comprises a tool holding member which is removably mounted in the bowl.

Thus, it will be understood that when no tool is used, the fact of storing the tool carrying member within the interior itself of the bowl resting on the base of the housing of the apparatus, permits storing the various tools without encumbering the tool carrier. Moreover, the bowl of the apparatus preferably serves itself both as the working receptacle of the various tools for processing food when the apparatus is in service, and as the storage box for the tool carrier when the apparatus is not in service.

According to a preferred embodiment, the tool carrying member comprises a circular plate pierced with a plurality of recesses removably receiving various types of tools and whose upper surface is vertically surmounted in its center with a hollow standard of generally approximately cylindrical shape which opens from the lower surface of the plate and on which are removably mounted other types of tools, the assembly carrying the tools and formed by the plate and the standard being mounted in the bowl by engagement of the outlet of said standard about a central mounting extending vertically above the bottom of the bowl and adapted to receive the shaft of the motor group.

The characteristics and advantages of the invention will become further apparent from the description which follows, by way of non-limiting example, with reference to the accompanying drawings, in which:

FIG. 1 is a schematic perspective view of an electric household appliance for processing foodstuffs and comprising a chopping knife;

FIG. 2 is a perspective view, on an enlarged scale, of the chopping knife of FIG. 1;

FIG. 3 is a perspective view of a disk adapted to support various types of tools;

FIG. 4 is an exploded schematic perspective view of a portion of the electric household appliance comprising a device for storing tools according to the invention;

FIG. 5 is a view similar to FIG. 1 showing schematically the storage device for the tools of FIG. 4;

FIG. 6 is a perspective view, on an enlarged scale, of a member of the storage device of FIG. 2, the tools not being in place;

FIG. 7 is a cross-sectional view on the line VII—VII of FIG. 6, the tools being in place;

FIG. 8 is a cross-sectional view on the line VIII—VIII of FIG. 6, the tools being in place; and FIG. 9 is a top plan view of the piece of FIG. 6, only the chopping knife being in place.

As shown in FIG. 1, the electric household appliance 1 for the processing of foodstuffs, called a kitchen robot, comprises a housing 2 of general L shape which encloses a motor group (not shown) and which has a region forming a base 4. On this base 4 is removably mounted a working bowl or receptacle 6 of transparent plastic material, provided with a handle 7 and whose bottom 8 comprises a central vertical mounting 10 opening from said bottom 8, which is driven in rotation by a drive shaft 12 of the motor group projecting vertically from the base 4, and on which are mounted alternatively in a removable manner various rotatable working tools such that the latter may be driven in rotation by the mounting 10 and may carry out different operations for processing foods, such as chopping, mixing, grating, mincing or cutting fruits or vegetables, as desired by the user.

In FIG. 1, a removable cover 14 is secured to the upper portion of the bowl 6 during use. This cover 14 comprises a hopper or feed tube 15 which passes through the cover and opens into the upper portion of the bowl 6 and into which are introduced the foodstuffs to be prepared.

As a type of rotatable tool for processing foodstuffs, there has been shown in FIG. 1 a knife 17 for chopping or mixing foodstuffs which is secured on the drive mounting 10. As the mounting of FIG. 2, this knife 17 comprises a tubular vertical shaft 19 having, in this embodiment, a cylindrical portion 19a prolonged downwardly by a to portion 19b in the form of a bell, as well as two horizontal blades, an upper blade 21 and the other a lower blade 22, secured to the portion 19b of the shaft 19 and each having the shape of a crescent whose convex portion constitutes the cutting portion 21a, respectively 22a.

In FIG. 3, there is shown purely by way of illustration and in no way limiting, three types of different interchangeable tools for processing foodstuffs, namely a vegetable cutter 25, a grater 26 and a mincing tool 27. In this embodiment, FIG. 3, each of the three working tools 25, 26 and 27 has the shape of a circular sector that can be inserted, at the choice of the user, in a cutout 29 of the same shape provided in a rotatable support disk 30. During use of the apparatus, the disk 30 provided with the selected tool 25;26;27 is secured on the drive mounting 10 by engagement of the latter in central opening 32 provided in the disk 30, such that the tool 25;26;27 secured to the disk 30 will be driven in rotation to carry out the processing operation assigned to it.

The electric household appliance moreover comprises a device, designated generally by reference numeral 35 in FIGS. 4 and 5, permitting storing the various tools, namely in this case the chopping knife 17, the vegetable cutter 25, the grater 26 and the mincing tool 27, as well as the support disk 30 for each of these three latter-mentioned tools, when none of these tools is used, which is to say when the apparatus is not in service.

According to the invention, this device 35 for storing tools comprises a tool holding piece 37 which is removably mounted in the bowl 6.

As shown in FIG. 5, the tool holding piece 37 extends vertically over a height which is less than that of the bowl 6 such that the piece 37 will be trapped in the bowl 6 when the latter is closed by the cover 14, thereby protecting direct access to the tool holding piece 37.

It will be understood that the bowl 6 of the apparatus serves advantageously both as a working bowl for the various tools for processing foodstuffs when the apparatus 1 is in service (see FIG. 1) and as a storage bowl for the tool holder piece 37 when the apparatus 1 is not in service (see FIG. 5).

In the embodiment shown in FIG. 4 and as will be better seen in FIG. 6, the tool holder piece 37 comprises a circular plate 39 whose lower surface 39a is provided at its periphery with a plurality of vertical tongues 41 that come to bear against the bottom 8 of the bowl 6 upon mounting of the piece 37 in the bowl 6 of the apparatus (see FIG. 5), and whose upper face 39b is surmounted at its center with a hollow standard 43, with a vertical axis of symmetry XX', which opens from the lower surface 39a of the plate 39 and has, in this embodiment, a portion 43 in the form of a bell prolonged upwardly by a cylindrical portion 43b, see FIG. 6.

With respect to FIGS. 4, 6 and 7, the plate 39 is pierced with a plurality of identical recesses 49, in this case six in number, of generally rectangular shape, extending parallel to each other and distributed equally in two regions, designated 46 and 47 in FIG. 6, which are diametrically opposite relative to the axis XX' of the standard 43, and through which are engaged vertically, by their constricted portion, the working tools in the form of a circular sector, in the number of 6 in the selected example shown in FIGS. 4 and 7, constituted respectively by the three tools 25, 26 and 27 mentioned above and by three other types of tools 49, 50 and 51 which themselves are engaged by their surface opposite to that of the three preceding tools. Each tool 25–27 and 49–51 is maintained vertically in place in the corresponding recess 45 by bearing of its enlarged portion against the internal edges 53 of the recess 45 (see FIG. 7).

As to FIGS. 4, 7 and 8, the standard 43 of the tool holder piece 37 is dimensionally adapted to receive by threading, first the shaft 14 of the chopping knife 17 which leaves free the upper region of the cylindrical portion 43b of the standard 43, then the support disk 30 with the cutout 29 on this upper region by coming into bearing on the upper end 55 (FIGS. 7 and 8) of the cylindrical portion 19a of the chopping knife 17 and by extending horizontally above the tools in the form of a circular section 25–27 and 49–51, at a distance from these latter, as well shown in FIG. 7.

With respect to FIGS. 6, 8 and 9, the upper surface 39b of the plate 39 is vertically surmounted by two convex blades 57 and 58 which border respectively the two cutting portions 21a and 22a of the blades 21 and 22 of the chopping knife 17 once fitted on the standard 43 (see FIG. 9) by rising particularly above the two blades 21 and 22, as shown in FIG. 8, thereby protecting the user against any wounding from the cutting blades of the knife 17.

There is shown at 60 in FIGS. 4, 6, 7 and 8, a gripping member in the form of a tail which is provided at the upper end of the standard 43 and which permits the user easily to seize the tool holder piece 37.

Preferably, the plate 39, the standard 43, the tongues 41, the protective blades 57 and 58, as well as the gripping member 60, are molded from a single piece of plastic material, such as polypropylene which is particularly economical and easy to clean.

As to FIG. 4, after engagement of the working tools in the form of sectors 25–27 and 49–51 in the recesses 45 of the plate 39 and after threading, first of the chopping blade 17, then of the support disk 30, on the standard 43, the assembly thus formed and constituting the tool holder piece 37 is mounted in the bowl 6 by engagement of the outlet 62 (FIG. 7) of the standard 43 about the mounting 10, the tongues 41 of the blade 39 coming into bearing against the bottom 8 of the bowl 6; the bowl 6 thereby receiving the tool holder piece 37 is closed by the cover 14, as shown in FIG. 5. The various tools are thus arranged in the bowl itself of the apparatus, so that the tool holder piece 37 presents no encumbrance.

During use of any one of the tools previously stored, the user withdraws, after opening the cover 14, the tool holder piece 37 from the bowl 6, then fixes the selected working tool onto the drive mounting 10 secured to the bottom of the bowl 6, as for example the chopping knife 17 as shown in FIG. 1.

What is claimed is:

1. Electric household appliance for processing foodstuffs, comprising a housing (2) enclosing a motor group and having a region forming a base (4) on which is removably mounted a bowl (6) whose bottom (8) is traversed by a drive shaft (12) of the motor group, various rotatable working tools (17, 25 to 27, 49 to 51) fulfilling different functions and mounted alternatively removably in the bowl (6) to be coupled with said drive shaft (12), as well as a device (35) permitting storing the tools when none of the latter is used, characterized in that the storage device (35) comprises a tool holder piece (37) which is removably mounted in said bowl (6).

2. Electric household appliance according to claim 1, in which the bowl (6) is provided with a closure cover (14), characterized in that the tool holding piece (37) extends vertically over a height which is less than that of the bowl (6) such that said piece (37) will be trapped within the bowl (6) when the latter is closed.

3. Electric household appliance according to claim 1, characterized in that the tool holder piece (37) comprises a circular plate (39) pierced with a plurality of recesses (45) receiving removably certain types of tools (25 to 27, 49 to 51) and whose upper surface (39b) is vertically surmounted at its center with a hollow standard (43) of generally approximately cylindrical shape which opens through the lower surface (39a) of the plate (39) and on which are removably mounted other types of tools (17, 30), the assembly carrying the tools and formed by the plate (39) and the standard (43) being mounted in the bowl (6) by engagement of the outlet (62) of said standard (43) about a central mounting (10) extending vertically above the bottom (8) of the bowl (6) and adapted to receive the shaft (12) of the motor group.

4. Electric household appliance according to claim 3, in which the tools are, on the one hand, a vegetable cutter (25), different forms of graters (26) and the like which are constituted each by a working piece of circular sector form that can be inserted, during use, in a cutout (29) of the same shape provided in a disk (30) having a central opening (32), and on the other hand, a knife (17) secured to a tubular shaft (19) of generally approximately cylindrical shape, characterized in that the pieces in the form of a sector (25, 26) are vertically engaged, by their narrowed portion, through the recesses (45) whose internal edges (53) retain the remaining portion of the sector shaped piece, the knife carrying shaft (19) is threaded on the standard (43) leaving free the upper portion of this latter, and the disk (30) is threaded on the upper portion of the standard (43) coming into contact with the upper end (55) of the knife carrying shaft (19) and extending horizontally above said sector shaped pieces (25, 26).

5. Electric household appliance according to claim 4, in which the knife (17) comprises two horizontal blades (21, 22) of crescent shape whose convex portion constitutes the cutting portion (21a, 22a), characterized in that the upper surface (39b) of the plate (39) is vertically surmounted by two convex protective blades (57, 58) which border respectively the two cutting portions (21a, 22a) of the blades rising particularly above the latter.

6. Electric household appliance according to claim 3, characterized in that the recesses (45) have a generally rectangular shape, extending parallel to each other and are distributed over two regions (46, 47) diametrically opposed relative to the vertical axis (XX') of the standard (43).

7. Electric household appliance according to claim 3, characterized in that the plate (39) is provided along its lower surface (39a) with a plurality of vertical tongues (41) that come to bear on the bottom (8) of the bowl (6).

8. Electric household appliance according to claim 3, characterized in that a gripping member (60) is provided at the upper end of the standard (43).

9. Electric household appliance according to claim 1, characterized in that the tool holder piece (37) is formed by molding from a plastic material.

* * * * *